US006739747B2

United States Patent
Millward (10) Patent No.: US 6,739,747 B2
(45) Date of Patent: May 25, 2004

(54) DRY CROP SUPPLEMENT INJECTION SYSTEMS, MICRONIZED CROP SUPPLEMENTS FOR USE IN INJECTION SYSTEMS, AND METHODS FOR INJECTION OF CROP SUPPLEMENTS

(76) Inventor: John P. Millward, 3120 N. 575 East, North Ogden, UT (US) 84414

( * ) Notice: Subject to any disclaimer, the term of this patent is extended or adjusted under 35 U.S.C. 154(b) by 153 days.

(21) Appl. No.: 10/081,443

(22) Filed: Feb. 22, 2002

(65) Prior Publication Data

US 2002/0186614 A1 Dec. 12, 2002

Related U.S. Application Data

(60) Provisional application No. 60/272,014, filed on Feb. 28, 2001.

(51) Int. Cl.[7] .............................. B01F 3/12; B01F 15/00
(52) U.S. Cl. ................................ 366/167.1; 368/174.1; 368/184
(58) Field of Search ......................... 366/167.1, 174.1, 366/184; 422/274, 278

(56) References Cited

U.S. PATENT DOCUMENTS

| | | | |
|---|---|---|---|
| 2,371,720 A | * | 3/1945 | Stine ........................... 422/266 |
| 2,604,386 A | * | 7/1952 | Arant ........................ 366/174.1 |
| 3,595,438 A | | 7/1971 | Daley et al. |
| 4,020,865 A | * | 5/1977 | Moffat et al. ................ 422/266 |
| 4,063,663 A | | 12/1977 | Larson et al. |
| 4,816,222 A | | 3/1989 | Fagrell |
| 5,007,559 A | * | 4/1991 | Young .......................... 422/266 |
| 5,229,084 A | * | 7/1993 | Livingston et al. .......... 422/266 |
| 5,681,109 A | | 10/1997 | Palmer |
| 5,713,384 A | * | 2/1998 | Roach et al. ................ 422/277 |
| 5,765,945 A | | 6/1998 | Palmer |
| 6,007,778 A | * | 12/1999 | Cholewa ...................... 422/102 |

* cited by examiner

*Primary Examiner*—Tony G. Soohoo
(74) *Attorney, Agent, or Firm*—Mallinckrodt & Mallinckrodt; Robert R. Mallinckrodt (57) ABSTRACT

A dry supplement injection system produces a supplement slurry which is continuously introduced into a flow of irrigation water. The injection system includes a hopper having a cylindrical upper portion and a tapered lower portion terminating at a slurry outlet opening. An inverted perforated funnel assembly is disposed within the hopper. A spray nozzle connected to a water inlet pipe sprays water onto the inner surface of the funnel such that particles of micronized supplement in the hopper are washed through the perforated funnel forming a slurry. A mixing pan disposed below the hopper acts as a reservoir to hold slurry until pumped out through a slurry pump which pumps the slurry into a pressurized irrigation water pipe. Gravity feed of the slurry may replace the slurry pump for applications where the irrigation water is non-pressurized such as flood irrigation.

74 Claims, 9 Drawing Sheets

DRY CROP SUPPLEMENT INJECTION SYSTEMS, MICRONIZED CROP SUPPLEMENTS FOR USE IN INJECTION SYSTEMS, AND METHODS FOR INJECTION OF CROP SUPPLEMENTS

RELATED APPLICATIONS

This patent application claims priority based on my co-pending provisional patent application No. 60/272,014 filed Feb. 28, 2001, the disclosure of which is herein incorporated by reference.

BACKGROUND OF THE INVENTION

1. Field

The present invention relates to irrigation and crop supplement application devices and more particularly to fertigation devices in which a supplement is suspended in irrigation water.

2. State of the Art

Crops are an important component of feeding the world's population, by direct consumption such as wheat, corn, and rice, and by indirect consumption by eating animals which have directly consumed the crops. Growing crops uptake water and dissolved minerals in order to grow and sustain themselves by photosynthesis. However, the amount of water available for irrigating crops is diminishing each year in many areas due to the encroaching populations of people which compete for water and changes in precipitation due to global weather changes such as global warming.

In ancient times prior to such shortages of water, irrigation was typically conducted by utilizing aqueduct and irrigation ditches between the crops to bring water from distant lakes and other such water reservoirs. More recently with the advent of pressurized water systems, spray systems were developed which are movable such as drip tape, drips, emitters, micro-sprays, sprinklers on hand lines as well as by rolling on wheels to irrigate crops. Some methods of irrigation waste considerable amounts of water due to evaporation and run-off of water which does not reach the roots of the plants.

Crops must typically be fertilized and treated with soil amendments and insecticides routinely for proper growth. This may be done by spraying fertilizers, insecticides, soil amendments, and other crop supplements (hereinafter referred to as supplements) on the crops, which is done between irrigation periods, requiring extra water to be used. A technique called fertigation was developed which utilizes the irrigation water to distribute supplements. Fertigation is the most effective method of applying supplements to crops. Fertigation is a process of injecting supplements in the prescribed amount and at a specific time into the water stream during the irrigation process. Compared to conventional ground application, fertigation also improves supplement efficiency. Therefore, comparable or better crop yields and quality can be produced using twenty to fifty percent less supplement. Farmers using irrigation and fertigation have greater control over available water and also over the supplements supplied to the crop. Fertigation satisfies a need for greater efficiency by improving the return from each unit of input. Utilizing these irrigation systems to apply plant supplements offers growers the most efficient method for placing supplements in the root zone. Fertigation is fertilization via the irrigation system and is the most advanced and efficient practice of fertilization. Fertigation combines the two main factors in plant growth and development, which are water and supplements. The right combination of water and supplements is the key for high yield. The most efficient fertigation practice is to supply supplement in small regular applications. This allows the plant to be "spoon fed" and receive supplements, as it needs them, in a form of broad acre hydroponics. This also prevents valuable supplements from being leached from the soil profile before the plant has had a chance to use them. Supplement ratios can also best satisfy the need of the plant throughout the growth cycle.

The benefits of fertigation include: 1) uniform application in the form of uniform distribution and precision placement of supplements and other chemicals; 2) timely application wherein the materials can typically be applied regardless of weather or field conditions; 3) reduced application costs such that the cost of application is about one-third the cost of conventional application methods; 4) improved crop management using timely applications of small but precisely delivered amounts of supplement directly to the root zone allows growers to effectively manage supplement programs, which conserves supplement, saves money, and optimizes yield and quality; 5) reduced soil compaction by reduced tractor and equipment traffic in fields; 6) minimizes exposure of workers to chemicals through reduced operator handling, mixing and dispensing of potentially hazardous materials with people and non-target crops not being exposed to inadvertent chemical drifts; 7) reduced environmental contamination when fertigation devices used are properly designed and calibrated including having the recommended safety devices to help preserve the quality of the environment; 8) marginal farming areas can be fertilized after the crops have emerged from the ground rather than adding supplement prior to crop emergence and wasting money on unused supplement.

University studies have provided a guide to correct fertigation techniques, which includes: 1) growers must water and fertilize uniformly; and 2) growers must determine: a) which supplement formulations are most suitable for injection into the irrigation water system; b) the most appropriate analysis for specific crops at specific stages of growth; c) the amount to apply during a given fertigation event; and d) the timing and frequency of applications.

In most situations, fertigation is as good or better than conventional application methods. However, conventional application may still be preferred or required for some materials and/or situations. One should never inject any material that is not labeled and recommended to the crop and for injection through the system. Fertigation can save time, reduce labor and equipment requirements and conserve energy and materials. However, fertigation is beneficial only to the extent that the irrigation system is adequately designed, fully functional and properly managed.

Most types of highly water soluble supplements and liquid supplements are suitable for fertigation. Additionally, attempts have been made to use conventional granular supplements, but with limited success primarily due to settling out of undissolved particles and the lack of an efficient delivery system to inject the particles into the irrigation water. Examples of attempts to introduce a granular substance such as gypsum into water for the purpose of fertigation include U.S. Pat. Nos. 5,765,945 and 5,681,109 both issued to Palmer. Therein are disclosed respective apparatus and method for hydraulically adding the powderous substance or a liquid to a water system such as an irrigation ditch. The substance is held in a container provided with a screened lower zone and supplied with a water sprayer. The water sprayer deposits water on the interior surface of the screen which essentially dissolves the powderous substance present at and which passes through the screen. The slurry produced can be delivered to an irrigation ditch, creek, or the like. While the apparatus may work for highly soluble powderous substances, less soluble powderous substances such as gypsum, which requires fifty gallons of water to dissolve one pounds of gypsum tend to settle out in the apparatus and in the associated outlet pipes producing partial clogs and complete blockages.

There is a need for a fertigation delivery system which utilizes conventional supplement formulations which eliminates settling out of undissolved particles and which efficiently injects the particles into the irrigation water.

SUMMARY OF THE INVENTION

The present invention comprises a dry supplement injection system, a dry supplement injection irrigation system, a continuous feed dry supplement injection system, a micronized particulate composition for use in the dry supplement injection systems, and a method of introducing a dry supplement into a flow of irrigation water.

The dry supplement injection system is connectable to a water supply for supplying water under pressure to produce a slurry from supplements in a micronized form to be used in fertigation application that may contain both dissolved and undissolved supplements which is introduced into a flow of irrigation water for watering crops. The dry supplement injection system includes a dry supplement injection device having a main hopper which includes an outer wall defining a main hopper chamber, an upper portion having an inlet opening, and a lower portion having an outlet opening. A perforated funnel assembly is disposable within the chamber and includes an inverted, perforated funnel having a perforated outer wall defining a funnel chamber, a small upper opening, and a large lower opening. A vertically disposed inlet pipe extends through the upper opening and is affixed to the funnel with at least one spray nozzle fluidly connected to the pipe being disposed within the funnel chamber to spray water onto the wall of the perforated funnel. An inlet water pipe system includes a main pipe that connects to the water source through the wall of the main hopper to the inlet pipe and the spray nozzle wherein water discharged from the spray nozzle impinges on the perforated wall of the perforated funnel such that particles of micronized supplement are washed through the perforated funnel forming a slurry. An outlet water pipe system includes a slurry pump which draws slurry formed in the main hopper and passed through the outlet opening through a slurry pump inlet pipe and pumps the slurry under pressure through a slurry pump outlet pipe into an irrigation water pipe through which the flow of pressurized irrigation water flows for irrigating the crops. The slurry pump may be eliminated for use with non-pressurized irrigation water conduits.

The dry supplement injection irrigation system is connectable to a water supply for supplying water under pressure to produce a slurry from supplements in a micronized form to be used in fertigation application that may contain both dissolved and undissolved supplements, and for introducing the slurry into a flow of irrigation water and spraying onto crops. The dry supplement injection irrigation system includes a dry supplement injection device of the type described above, and an irrigation device to which the injection device is connectable having an irrigation water pipe through which the flow irrigation water flows for irrigating the crops.

The continuous feed dry supplement injection system is connectable to a water supply for supplying water under pressure to produce a slurry from supplements in a micronized form to be used in fertigation application that may contain both dissolved and undissolved supplements which is introduced into a flow of irrigation water for watering crops. The continuous feed dry supplement injection system includes a dry supplement injection device of the type described above, and a motorized feed screw assembly. The motorized feed screw assembly includes a feed screw hopper for receiving the micronized supplement, and a motorized feed screw which includes an inclined outer tube having an inlet connected to a lower outlet of said feed screw hopper and which is upwardly inclined from the feed screw hopper to an outlet disposed above the inlet opening of the main hopper. A feed screw closely fits within the outer tube and is rotationally driven by a motor. The micronized supplement enters the outer tube through the inlet thereof and is transported through the outer tube by the feed screw to the outlet and into the main hopper for production of slurry therefrom.

The micronized particulate composition is for use in the dry supplement injection systems, and includes a plurality of particles of at least one material, wherein at least fifty percent and preferably between about ninety-five to ninety-nine percent of the particles are smaller than about 74 microns (200 mesh) in size for producing the slurries.

The method of introducing a dry supplement into a flow of irrigation water includes the steps of: 1) providing a dry micronized supplement; 2) producing a slurry of the micronized supplement and water, which slurry may contain both dissolved and undissolved particles of the micronized supplement, by spraying water at an interior surface of an inverted perforated funnel which separates the dry micronized supplement from an interior chamber of the funnel; and 3) pumping the slurry produced into a flow of irrigation water for watering crops.

THE DRAWINGS

The best mode presently contemplated for carrying out the invention is illustrated in the accompanying drawings, in which:

FIG. 1 is a perspective view of a dry supplement injection device in accordance with the present invention;

FIG. 2, a lateral horizontal sectional view taken on the line 2—2 of FIG. 1 showing a perforated funnel assembly contained within the main hopper;

FIG. 3, a longitudinal vertical sectional view taken on the line 3—3 of FIG. 2 showing the internal structure of the main hopper and the perforated funnel assembly;

FIG. 4, a lateral horizontal sectional view taken on the line 4—4 of FIG. 3 further showing the internal structure of the main hopper and the perforated funnel assembly;

FIG. 5, a fragmentary view corresponding to FIG. 3 but to an enlarged scale, showing the spray pattern of a rotary nozzle spraying water within the funnel assembly;

FIG. 6, a lateral horizontal sectional view taken on the line 6—6 of FIG. 5 showing another perspective of the spray pattern within the funnel assembly;

FIG. 7, a side elevational diagrammatic view of the dry supplement injection device showing the operation thereof;

FIG. 8, a top plan view of the dry supplement injection device as part of a rotary field slurry production apparatus according to the invention, comprising the dry supplement injection device and a pivotally mounted wheeled irrigation device;

FIG. 9, a front elevational view taken on the line 9—9 of FIG. 8 showing the height of the slurry generator which allows the wheeled irrigation device to roll completely therearound;

FIG. 10, a perspective view of the wheeled irrigation device.

DETAILED DESCRIPTION OF THE ILLUSTRATED EMBODIMENTS

Referring to FIGS. 1–4, therein is shown a slurry generator or dry supplement injection device in accordance with the present invention, generally designated at 20, for introducing dry supplements to irrigation systems.

The injection device 20 includes a main hopper 23, a stand 26, a perforated funnel assembly 29, an inlet water pipe system 32, a mixing pan 35, and an outlet water pipe system 36. The main hopper 23 includes a large upper portion 38 having an inlet opening 41, and a tapered lower portion 44 having an outlet opening 47. A removable lid 48 may cover the inlet opening 41. The stand 26 has a plurality of upright legs 50 with respective lower pads 53, the legs 50 being interconnected by an upper ring 56 which supports the upper portion 38 of the main hopper 23 and a lower ring 59 which supports the lower portion 44 of the main hopper 23. The funnel assembly 29 includes an inverted, perforated funnel assembly 62, a rotary spray nozzle 65, and piping 68 which is removably disposed within a chamber 71 of main hopper 23. Funnel assembly 62 includes an inverted, perforated funnel 74 having a small upper opening 77 with a clamp 80 and a large lower opening 83. The included (inside) angle of the perforated funnel 74 is preferably between about 20 and 60 degrees to provide a relatively steep outer surface against which micronized supplement (not shown) rests. The height of the perforated funnel 74 is larger for larger flow rates of the micronized supplement. An upper pipe 86 and a lower extender pipe 89 fluidly connect to the spray nozzle 65, upper pipe 86 which extends through the upper opening 77 and being clamped securely to the funnel 74 by the clamp 80. The extender pipe 89 positions spray nozzle 65 about midway vertically within a chamber 92 of the funnel 74 for optimally even spray distribution. The inlet water pipe system 32 includes an inner inlet pipe 95 which threadably connects to upper pipe 86 opposite the extender pipe 89, which bends horizontally outwardly terminating at a hand removable fitting 98. An outer inlet pipe 101 extends from the fitting 98 through the wall 104 of the main hopper 23. The mixing pan 35 includes a circular bottom wall 107 and an upstanding outer wall 110. A water inlet pipe 113 extends tangentially through the outer wall 110 adjacent the bottom wall 107, the flow of water therethrough being regulated by a float valve 116 which regulates the depth "D" of water within the mixing pan 35. An overflow prevention sensor 119 extends through the outer wall 110 to stop the inflow of water into mixing pan 35 if float valve 116 valve fails as explained subsequently.

The inlet water pipe system 32 connects to a water source (not shown) supplying water under pressure such as the municipal water system through a main pipe 122 which connects to the outer inlet pipe 101 extending through the wall 104 of the main hopper 23, connecting to the fitting 98, the extender pipe 89, and the spray nozzle 65. A pan water fill pipe 125 extends from the main pipe 122 to supply water through the float valve 116 and the water inlet pipe 113 to maintain the desired depth of the water within the mixing pan 35. An on/off water solenoid valve 128 electrically connected to the overflow prevention sensor 119, a hand valve 131, a flow meter 134, and an anti-siphon or block valve 137 all of the inlet water pipe system 32 are disposed along the main pipe 122 to control and monitor the flow of water to the perforated funnel assembly 29 and prevent the backflow or siphoning of water from main hopper 23 should water pressure be lost in the main pipe 122 from the water source.

The outlet water pipe system 36 includes a pump assembly 140 comprising a fluid pump 143 powered by an electric motor (not shown), which draws slurry 144 from the mixing pan 35 through a slurry pump inlet pipe 146, and pumps the slurry 144 under pressure through a slurry pump outlet pipe 149 to an irrigation water pipe 152 through which the main volume of irrigation water flows. A water flush pipe 153 of inlet water pipe system 32 extends from main pipe 122, and connects to the slurry pump inlet pipe 146. An on/off solenoid valve 154 is disposed along water flush pipe 153. The slurry 144 is pumped by pump 143 at a pressure higher than that in irrigation water pipe 152 and a block valve 155 is disposed along slurry pump outlet pipe 149 to prevent backflow of water from irrigation water pipe 152 into slurry pump outlet pipe 149. Also disposed along slurry pump outlet pipe 149 adjacent diaphragm pump 143 is a three way solenoid valve 158 to which a flushing water outlet pipe 161 is connected which leads to a waste water disposal such as a sewer pipe (not shown). The flow of water through irrigation water pipe 152 is controlled using a standard valve (not shown) disposed along irrigation water pipe 152 upstream of the connection of slurry pump outlet pipe 149 thereinto. A pressure relief pipe 164 connects a pressure relief valve 167 of the diaphragm pump 143 to the flushing water outlet pipe 161. An electronic controller 170 is electronically connected to solenoid valves 128, 154, and 158 to control the respective flow of water and slurry 144 through main pipe 122, water flush pipe 153, and flushing water outlet pipe 161.

Referring to FIGS. 5–7, injection device 20 operates to steadily liquify by dissolving or suspending particles of a micronized supplement 173 contained in main hopper 23 by first opening the hand valve 131 to start water flowing from the water source through the main pipe 122 into the funnel assembly 62 at the desired flow rate as indicated by the flow meter 134. The water discharges from spray nozzle 65 in a rotary fashion relatively equally against the inside of perforated funnel 74. This water spray causes the micronized supplement 173 at the perforations 76 of perforated funnel 74 to dissolve, and/or to become suspended in the water forming the slurry 144 comprised of the water and dissolved/suspended micronized supplement 113 which flows downwardly inside perforated funnel 74 to into the mixing pan 35. Water entering tangentially through the water inlet pipe 113 stirs the slurry 144 within the mixing pan 35 to keep undissolved particles of the micronized supplement 173 suspended in the slurry 144. The controller 170 is then activated to manually or automatically control the starting and stopping sequence of events of the injection device 20. The starting sequence begins with controller 170 starting the pump 143 to pump slurry 144 from the mixing pan 35 through the slurry pump inlet pipe 146 and out through the slurry pump outlet pipe 149. The slurry 144 is pumped under a pressure higher than that of the irrigation water within irrigation water pipe 152 with the flow of slurry 144 initially being diverted by solenoid valve 158 through flushing water outlet pipe 161 to a waste water disposal (not shown), such as a drain or sewer pipe, so as to properly prime pump 143 without the backpressure of irrigation water pipe 152. After about ten seconds, the slurry 144 is redirected by valve 158 through slurry pump outlet pipe 149 and into the main flow of irrigation water through irrigation water pipe 152 for fertilizing crops through an irrigation system (not shown). Pressure relief valve 167 is utilized to bleed off excess pressure from pump 143 as necessary should there be a blockage of the slurry output by allowing slurry to be output to flushing water outlet pipe 161 through pressure relief pipe 164 into the waste water disposal. When the irrigation cycle is completed, the flow of water into perforated funnel assembly 62 is stopped by closing hand valve 131 and the mixing pan 35 is flushed by continuing to run pump 143 while clean water enters through float valve 116. The controller 212 then begins the stopping sequence wherein a flow of flush water clears the pump 143 and the slurry pump outlet pipe 149 of slurry by opening solenoid valve 154 from main pipe 122. Clean water flows through water flush pipe 153 and closing solenoid valve 155 which is pumped by the pump 143 out through the slurry pump outlet pipe 149 to clear out any remaining slurry 144 so particles do not settle out and clog the system. Solenoid valve 154 is then closed to stop the flow of water through water flush pipe 153 and the pump 143 stopped. Irrigation water in irrigation water pipe 152 is prevented from backflowing into mixing pan 35 due to block valve 155 and from backflowing through water flush pipe 153 due to solenoid valve 154 being closed. Additionally, block valve 155 prevents the backflow of water into the mixing pan 35 during operation should the normal pressure differentials between the pump 143 and the irrigation water pipe 152 not be maintained.

Figure 1:
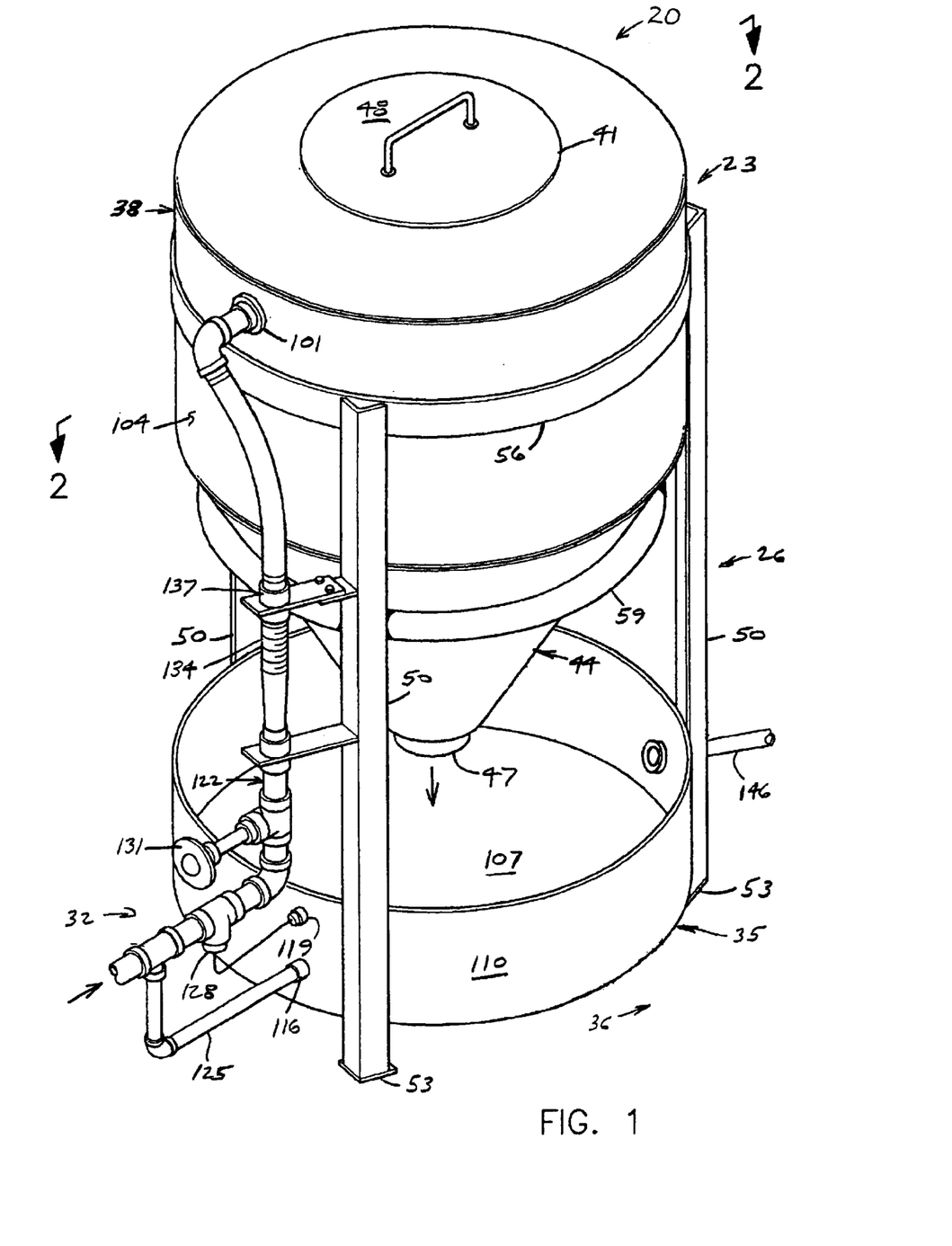
Figure 2:
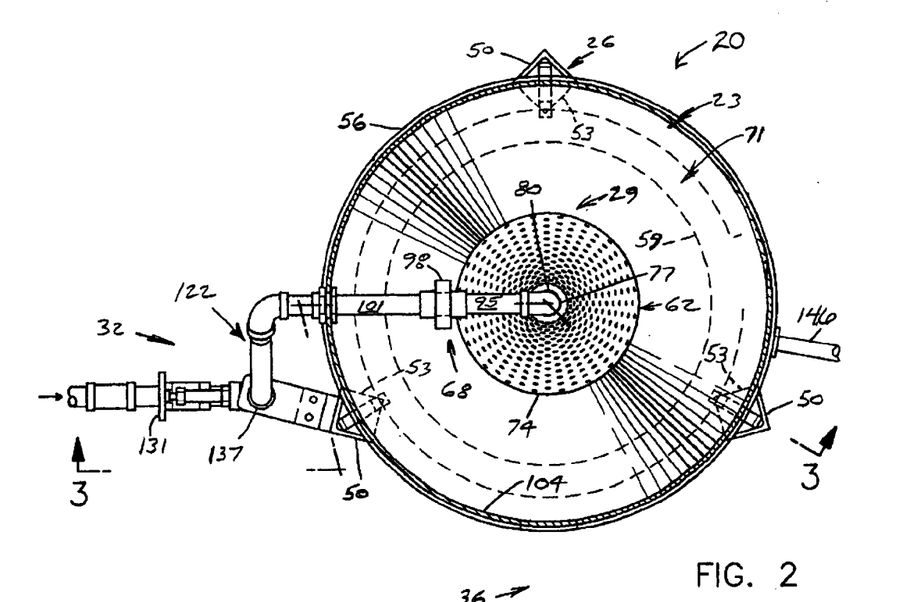
Figure 3:
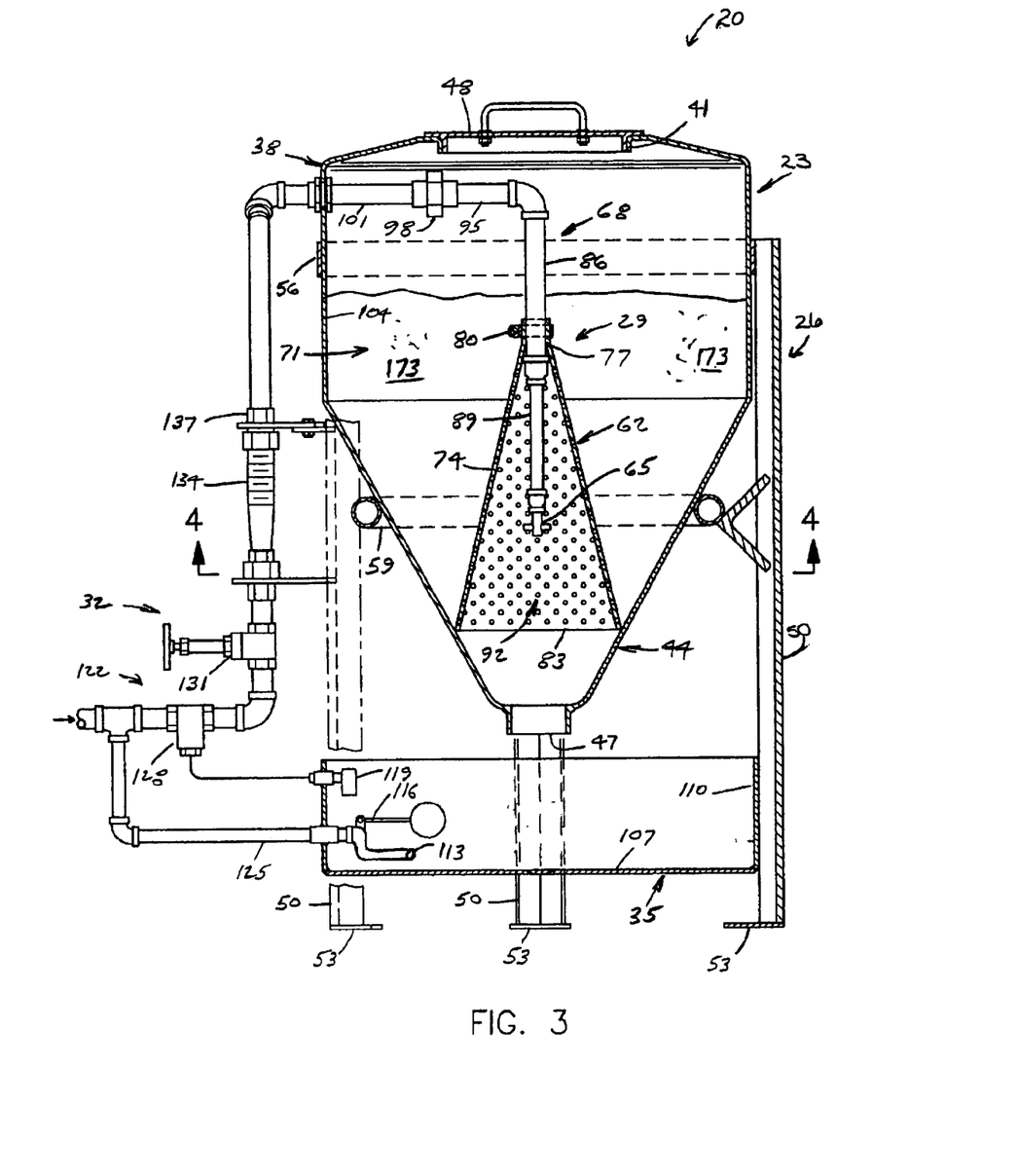
Figure 4:
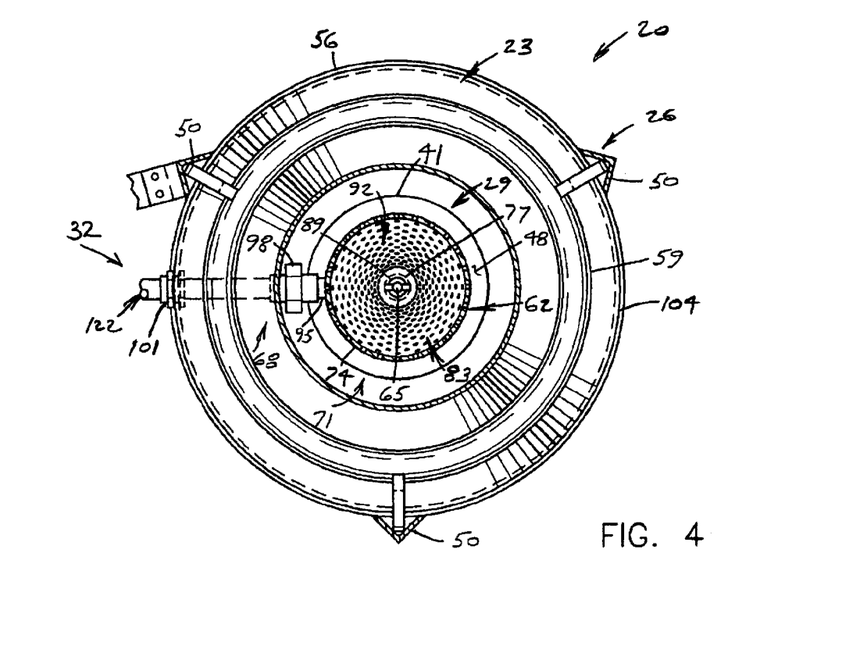
Figure 5:
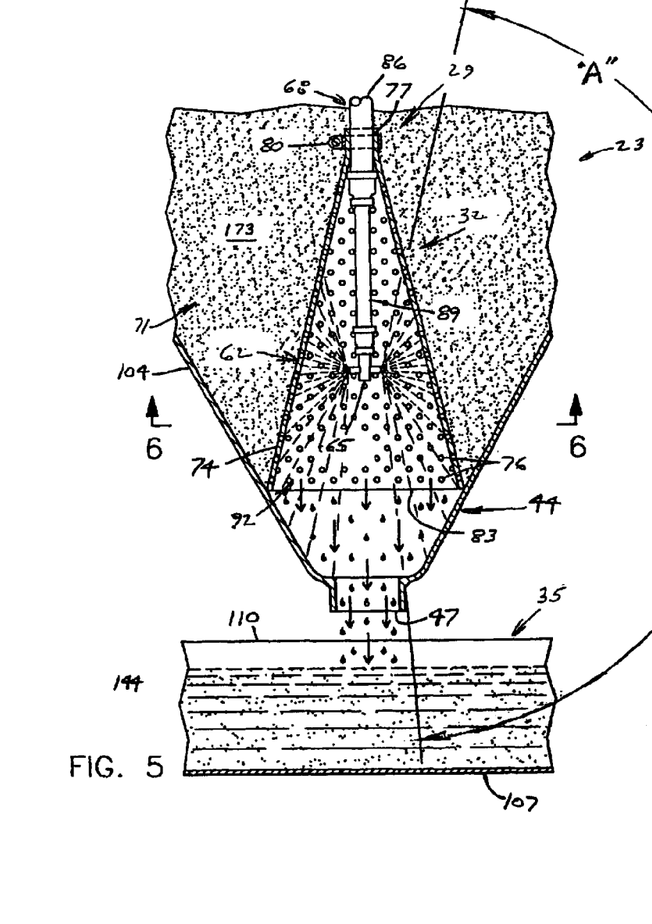
Figure 6:
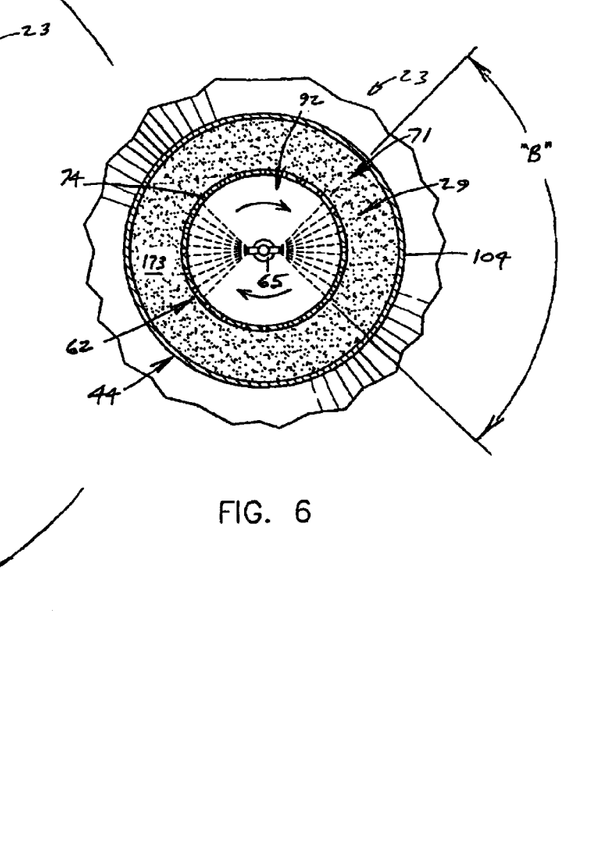
Figure 7:
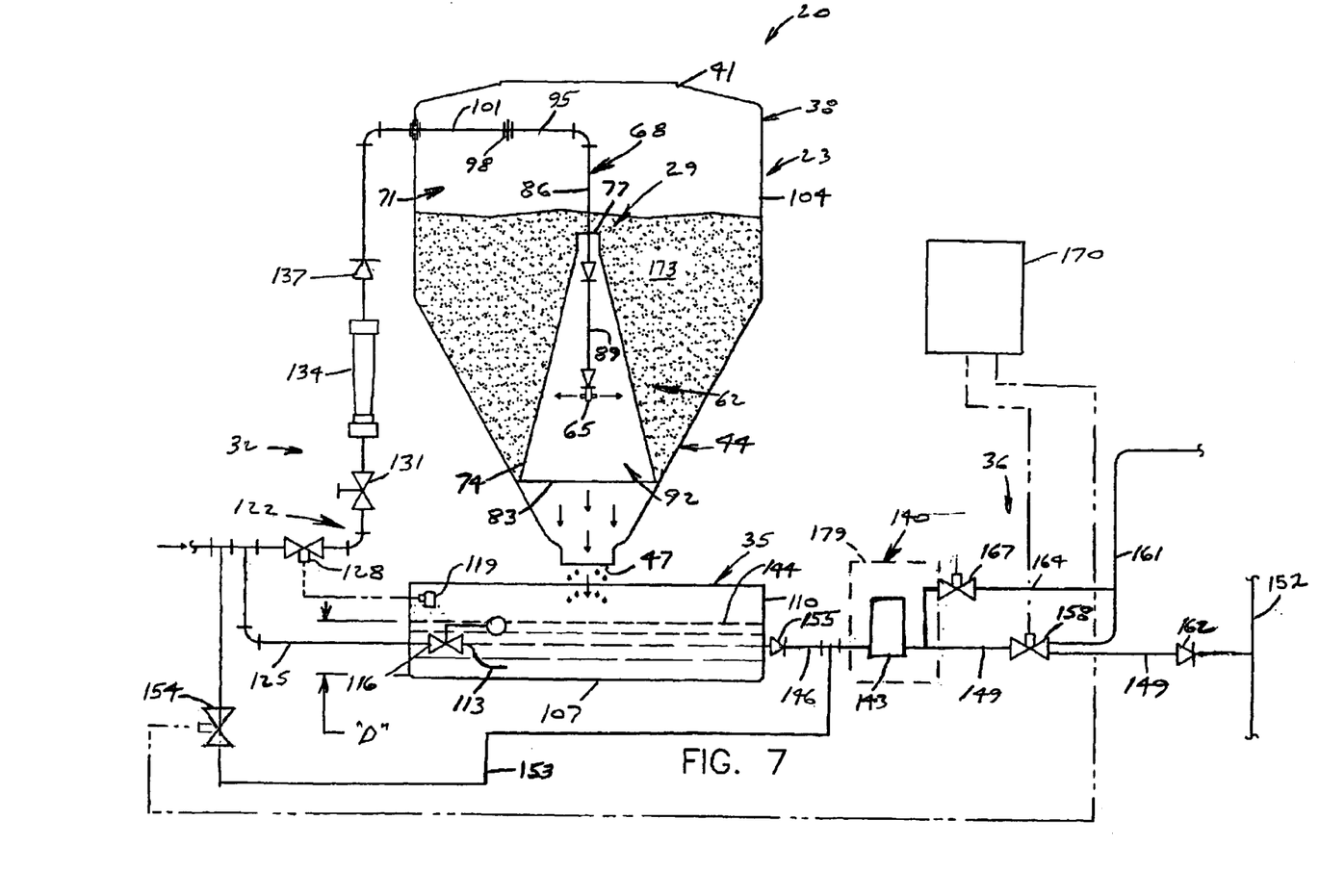
Figure 8:
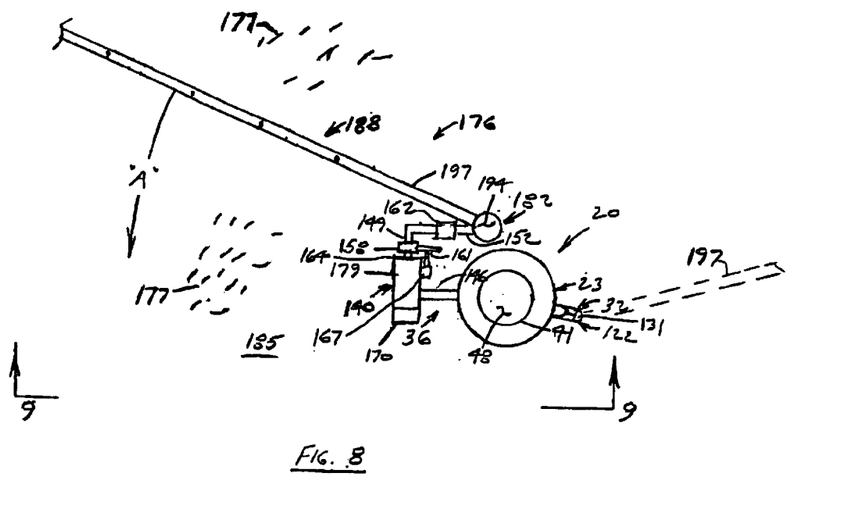
Figure 9:
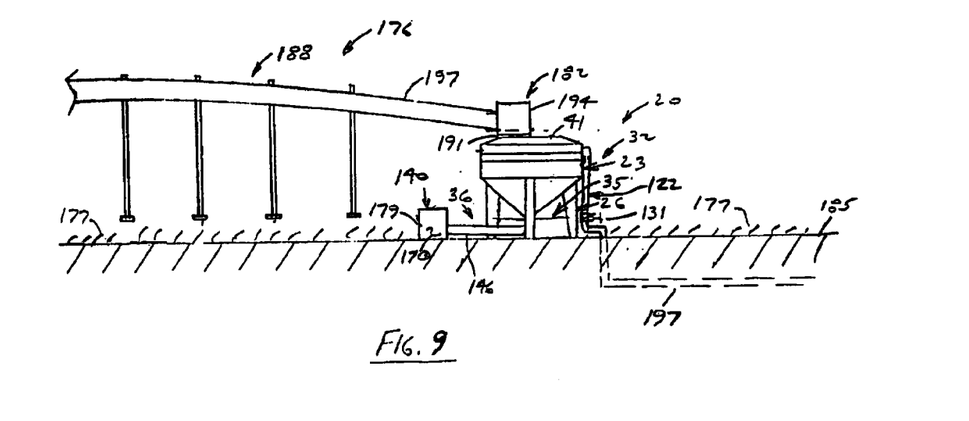
Figure 10:
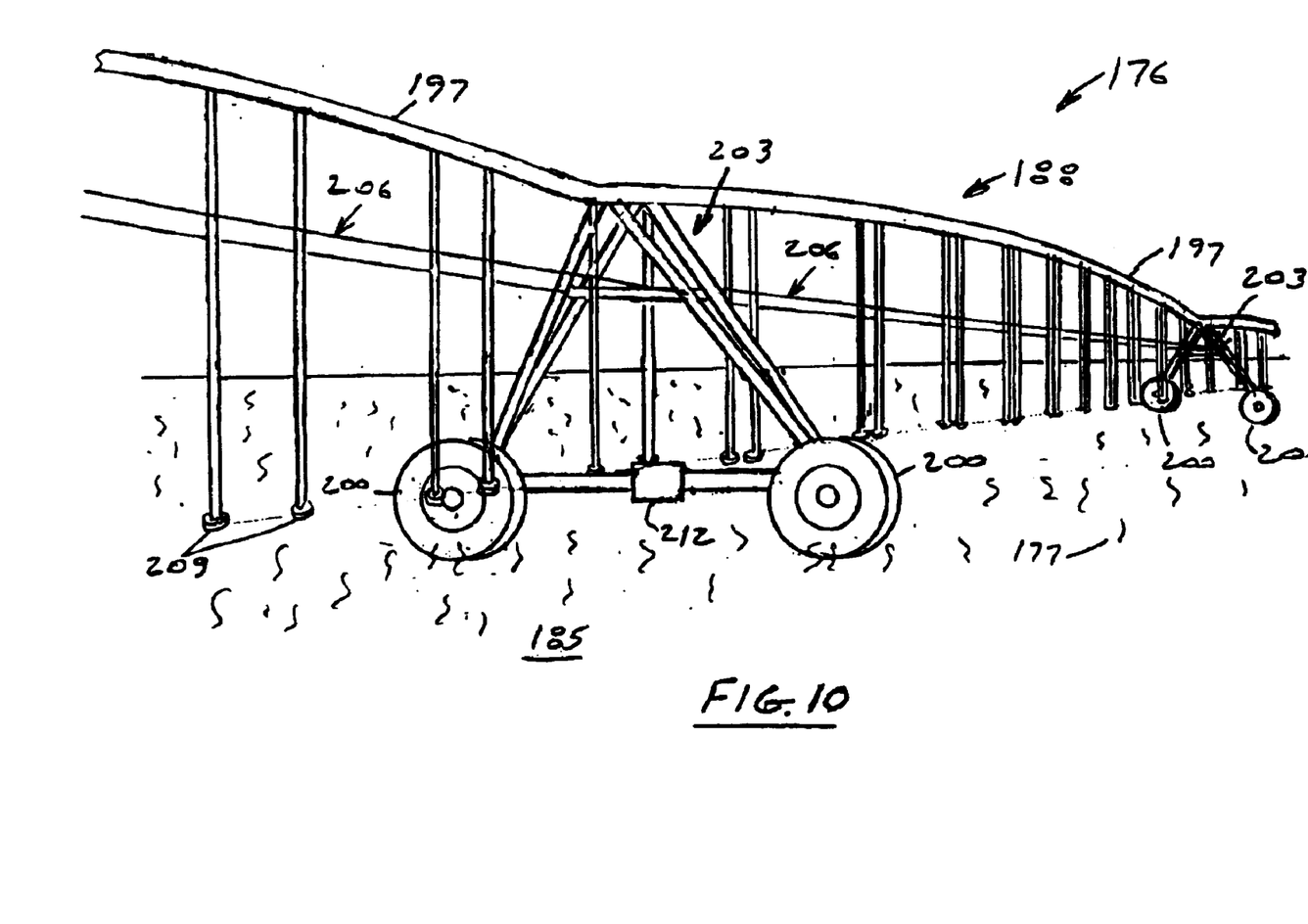

Referring to FIGS. 8–10, therein is shown injection device 20 as connected to a standard pivot mounted, wheeled irrigation device 176 for use in open fields of crops 177. Main pipe 122 of the inlet water pipe system 32 connects to a water source (not shown) such as an underground well or the municipal water system supplying water under pressure. Pump assembly 140 of the outlet water pipe system 36 is shown enclosed in a waterproof casing 179 for protection from precipitation, and the removable lid 48 of the main hopper 23 protects the micronized supplement 173 from exposure to rain and other precipitation. The micronized supplement must be transported by motor vehicle to the location of the injection device 20 and dumped through the inlet opening 41 of main hopper 23. The slurry is pumped under pressure into slurry pump outlet pipe 149 for discharge from the irrigation device 176 onto the fields of crops 177.

Wheeled irrigation device 176 comprises a water supply pivot post 182 which is affixed into the ground 185, and a wheeled sprayer 188 which is pivotally connected thereto. Pivot post 182 includes anon-rotating post 191 which is affixed in the ground 185, and a rotatable cap 194 which is affixed to an irrigation water supply pipe 197 which extends from pivot post 182 above the ground 185. The slurry is pumped by pump assembly 140 through slurry pump outlet pipe 149 and non-rotating post 191, through a bearing and seal assembly (not shown) which seals between and rotatably interconnects non-rotating post 191 and rotatable cap 194, and into irrigation water supply pipe 197.

Wheeled irrigation device 176 further comprises a plurality of small diameter, pneumatic wheels 200 which are rotatably connected in pairs to respective A-frames 203 spaced along irrigation water supply pipe 197, which pipe 197 is vertically supported therebetween by respective brace wire assemblies 206 with respective spray heads 209 extending downwardly from irrigation water supply pipe 197 between A-frames 203 for discharging water downwardly and outwardly onto the crops 177 being irrigated. Wheels 200 are rotationally powered on A-frames 203 by respective water motors 212 which are attached to the A-frames 203 and powered by the pressurized irrigation water. Wheeled irrigation device 176 slowly pivots about pivot post 182 as shown by the arrows "A" as wheels 200 are driven by water motors 212 so as to irrigate a large circular area of crops about pivot post 182.

Figure 11:
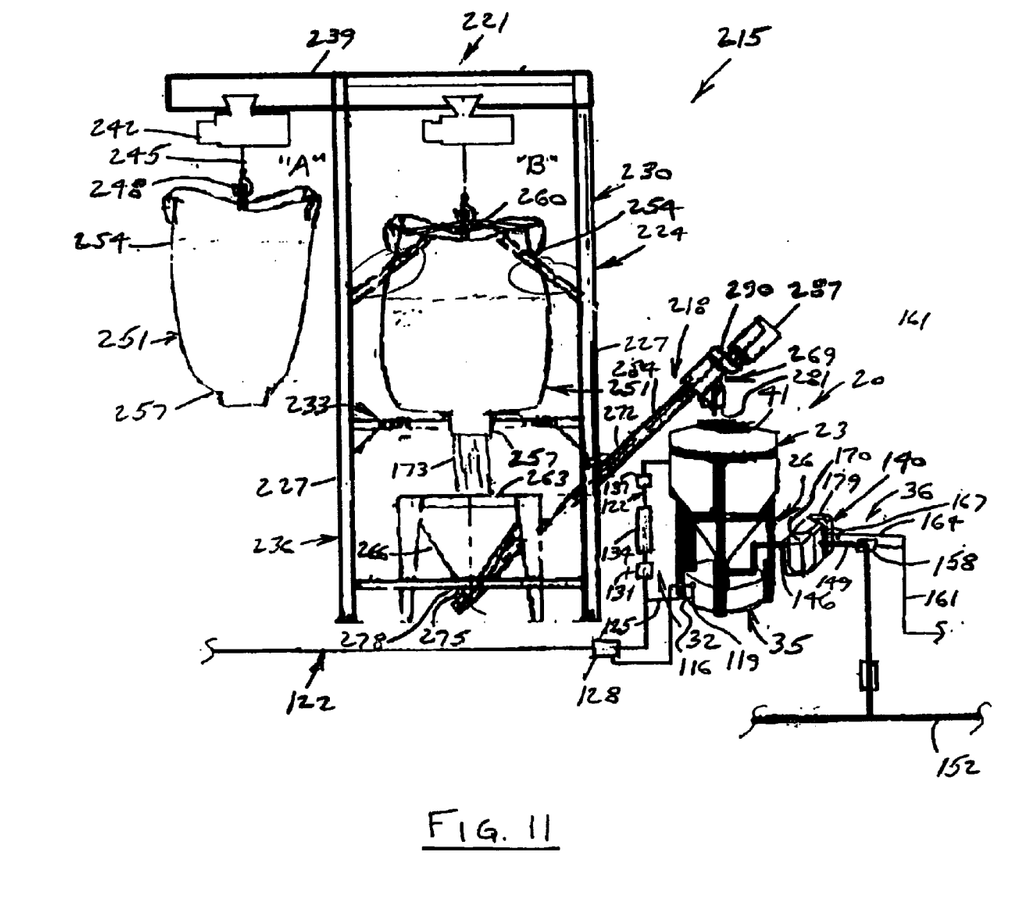
FIG. 11, a front elevational view of a first continuous feed slurry production apparatus, comprising the dry supplement injection device, a hoppered feed screw, and an overhead loading system.

Referring to FIG. 11, therein is shown a continuous feed slurry production apparatus 215 which comprises the injection device 20, a hoppered feed screw 218, and an overhead loading system 221. The loading system 221 includes an upright main frame 224 having a plurality of elongate upstanding legs 227 interconnected by an upper frame 230, a middle platform 233, and a lower frame 236. An I-beam 239 is affixed to upper frame 230 and carries a rollable chain lift 242 having a dependent chain 245 and hook 248. Loading system 221 is designed to lift and convey standard micronized material bags 251 which is initially filled such as with the micronized supplement 173, such bags 251 comprising an upper portion 254 and a tapered lower outlet chute 257. The bags 251 are lifted from a transport vehicle (not shown) at a loading position "A" by means of chain 245 and hook 248 which are connectable to respective corner straps 260 of bags 251, and moved along I-beam 239 to an unloading position "B" where bags 251 are lowered onto middle platform 233, with outlet chute 257 extending through a hole 263 through the middle platform 233.

The micronized supplement 173 is transported from the overhead loading system 221 into the main hopper 23 of the injection device 20 by means of the hoppered feed screw 218, which comprises a funnel shaped feed screw hopper 266 disposed below the middle platform 233 for receiving the micronized supplement 173 from outlet chute 257 of the bags 251, and a motorized feed screw 269 having an upwardly inclined outer tube 272 having an inlet 275 connected to a lower outlet 278 of feed screw hopper 266 and an outlet 281 disposed above the inlet opening 41 of main hopper 23. A feed screw 284 closely fits within and extends through outer tube 272, being rotationally driven by an electric motor 287 and a gear box 290 attached to outer tube 272 adjacent outlet 281 thereof. The micronized supplement 173 enters outer tube 272 through inlet 275 and is transported therethrough by means of feed screw 284 to outlet 281, and out into main hopper 23 of the injection device 20.

The continuous feed slurry production apparatus 215 operates by feeding micronized supplement 173 to the injection device 20. This is by means of picking up a bag 251 containing the micronized supplement 173 using chain lift 242 of overhead loading system 221 at position "A", moving bag 251 to position "B", and lowering onto middle platform 233 of upright main frame 224. A valve (not shown) in lower outlet chute 257 of bag 251 is opened allowing micronized supplement 173 to discharge therefrom through lower outlet 278 of feed screw hopper 266. Motor 287 is then activated to feed micronized supplement 173 through feed screw 269 and out into main hopper 23 of injection device 20. While motor 287 can be manually turned on and off by a person or by an electric eye (not shown) or other such sensor so as to keep main hopper 23 full, typically motor 287 is of adjustable speed and can be continuously run at a speed which deposits micronized supplement 173 into main hopper 23 at the same rate at which it is removed, which rate depends on the flow rate of water therethrough, so as to maintain a constant amount of micronized supplement 173 therein.

Figure 12:
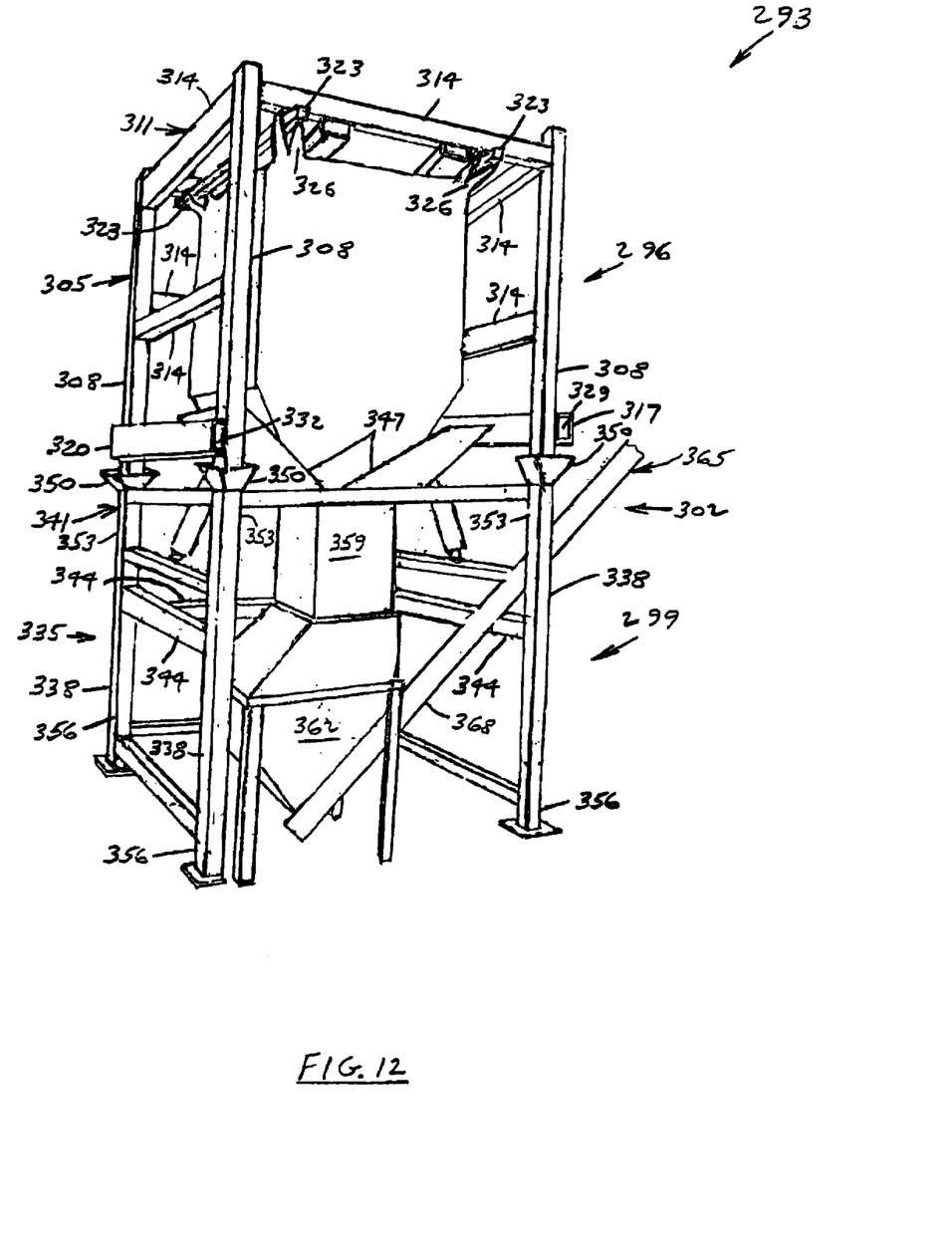
FIG. 12, a perspective view of a second continuous feed slurry production apparatus which vertically separates for loading and unloading of containers.

Referring to FIG. 12, therein is shown a second embodiment continuous slurry production apparatus 293, having an upper portion 296 and a lower portion 299. A second embodiment hoppered feed screw 302, the upper portion 296 which vertically separates from lower portion 299 for loading and unloading of micronized material bags 251. Upper portion 296 includes a frame 305 having a plurality of elongate upstanding legs 308 interconnected by an upper frame 311 and a plurality of connector beams 314, and a pair of elongate lift brackets 317 and 320. A plurality of lift hooks 323 extend downwardly from upper frame 311 to hang bags 251 from by means of corner straps 326 thereof. Upper portion 296 is of sufficient height so as to support bag 251 off of a floor surface (not shown) when separated from lower portion 299, and lift brackets 317 and 320 allow picking up of upper portion 296 with bag 251 by means of inserting the respective forks of a fork lift (not shown) through holes 329 and 332 of lift brackets 317 and 320. Lower portion 299 includes a frame 335 having a plurality of elongate upstanding legs 338 interconnected by an upper frame 341 and a plurality of connector beams 344, and having a V-shaped bag support 347. A plurality of support sockets 350 are affixed to respective upper ends 353 of legs 338 to receive respective lower ends 356 of legs 308 to support upper portion 296 thereon.

The micronized supplement 173 is transported into the main hopper (not shown) of the supplement injection device by means of the hoppered feed screw 302, which includes a vibratory or other such bag massager 359 mounted atop a funnel shaped feed screw hopper 362, both being disposed below bag support 347 for receiving the micronized supplement 173 from bags 251, and a motorized feed screw 365 of similar design to hoppered feed screw 218, having an upwardly inclined outer tube 368 having an inlet (not shown) connected to a lower outlet (not shown) of feed screw hopper 362 and an outlet 371 disposed above an upper inlet opening of the main hopper (not shown). A feed screw (not shown) closely fits within outer tube 368, being rotationally driven by an electric motor and gear box (not shown). The micronized supplement 173 enters outer tube 368 through the inlet and is transported therethrough by means of the feed screw 365 to outlet 371, and into the main hopper of the supplement injection device (not shown). Slurry generator 23 utilizes controller 212 to control the sequence of events of slurry generator 23 in a similar manner to slurry generator 20.

The micronized particulate composition for use with the dry supplement injection system is not limited only to highly water soluble supplements, but rather also for standard supplement compositions which are manufactured into a micronized form that allows use in fertigation that to date have been too difficult to inject into irrigation systems.

When a slurry is produced, the micronized particulate composition is suspended in a slurry which contains both dissolved and undissolved particles in a water medium. The slurry is then introduced into the irrigation water system in a specific amount to supply the required amount of supplement to the crops. The size of the particles is very important in the slurry production to assure minimal settling out of particles, particularly when materials which are denser than water and of a lesser solubility in water are used. Slurries may be roughly divided into two categories based on settling behavior. Non-settling slurries are made up of very fine, highly concentrated, or neutrally buoyant particles. These slurries are normally treated as what are called false blending fluids, which may be quite viscous yet are not prone to settling out of particles. Conversely, settling or fast-settling slurries comprise coarser, denser particles that tend to settle out of the slurry rapidly.

While the particles in some slurries in accordance with the present invention may have a positive buoyancy respective to water, the present discussion will focus on particles which are denser than water. For a generally horizontal flow of fast-settling slurries, the following description may be made of particle size versus particle settling: 1) ultra-fine particles of 10 micron size or smaller are generally fully suspended and the particle distribution is not significantly influenced by gravity; 2) fine particles of 10 to 100 micron size or less (less than 150 Tyler or 140 USS) are generally fully suspended but gravity causes a concentration gradient wherein there is a higher concentration of particles towards the bottom of the pipe; 3) medium-size particles of 100 to 1000 micron size or less (150 to 16 Tyler mesh) may be fully suspended at high fluid velocities, but often form a layer of moving particles deposited on the bottom of the pipe. Attempting to form a slurry using dry supplement products with particles sized larger than 150 Tyler mesh can lead to settling out in the pipe and cause restricted flows or plugging of the pipe. For this reason, the mean particle size of the micronized particulate composition of the present invention is maintained at or below about 74 microns (200 mesh) in size for efficient slurry injection.

The following chart illustrates the relationship of particle size and slurry produced:

| Micron | Tyler Size | U.S. Standard | Inch | Remarks |
| --- | --- | --- | --- | --- |
| 10 | — | — | .0002 | OK for slurry injections |
| 53 | 270 | 270 | .0021 | OK for slurry injections |
| 74 | 200 | 200 | .0029 | OK for slurry injections |
| 105 | 150 | 140 | .0041 | Too large for slurry injection |
| 1,000 | 16 | 18 | .0394 | Too large for slurry injection |

Attempting to produce a slurry using dry supplements having particles larger than 150 Tyler mesh can lead to settling out in the piping and cause restricted flows or plugging. That is the reason for the mean particle size of about 74 microns (200 mesh) or less.

The dry supplement injection system and micronized particulate composition of the present invention permit more efficient application of crop supplements than has been possible in the past, by "spoon feeding" crops the supplements they require. The micronized supplement is produced by grinding or other particle size reduction methods as are known in industry. Water is used as the means of metering and transporting supplements to crops in the amount and at the time the supplements are required. Supplements are applied in small amounts during the growing cycle of the crop as required by the crop. The flow meter 134 is used to control the amount of supplement added to the irrigation system.

Many variations of the present invention are possible while staying within the same inventive concept. For example, while the inverted, perforated funnel is shown and preferred, other similar configurations of perforated members may also work which deviate from the inverted funnel, with the relatively steep angle of the wall perforated funnel contacting the micronized supplement (having an included angle of between about 20 to 60 degrees), and the size and shape of the perforations (being a round hole of a diameter of between about one-sixteenth and three-sixteenths inch) being most critical to operation. Also, while a pump is shown to pressurize the slurry to pump into the irrigation water pipe containing a flow of pressurized irrigation water, the pump can be eliminated and gravity flow utilized for non-pressurized irrigation water conduits such as irrigation channels used for flood irrigation of crops. Likewise, while supplements are typically used in the apparatus and methods of the present invention, other soil amendments are possible which are desired to be distributed as micronized particles through an irrigation system. The apparatus and methods may also be used in applications which do not pertain at all to crops but wherein the settling out of particulates is not desired. For further example, while a mixing pan is shown in the preferred embodiment such as for use with piston and rotary type fluid pumps, the mixing pan may be eliminated in certain cases such as wherein the pump is a diaphragm pump that a variable volume of slurry to be pumped depending on the flow rate of water into perforated funnel assembly. Such dry operation would typically ruin a non-diaphragm type pump. The water flush pipe and associated solenoid valve can then be used to prime the diaphragm pump. Note also, that any of the valves including the hand valve may be of a remotely actuatable type such as a solenoid valve, hand actuatable, or other such type of valve. The flow rates of slurry and water can be electronically monitored and controlled by the controller, or the controller eliminated such that all control is manual.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A dry supplement injection system connectable to a water supply for supplying water under pressure to produce a slurry from supplements in a micronized form to be used in fertigation application that may contain both dissolved and undissolved supplements which is introduced into a pressurized flow of irrigation water for watering crops, comprising a dry supplement injection device having a main hopper which includes an outer wall defining a main hopper chamber, an upper portion having an inlet opening, and a lower portion having an outlet opening, a perforated funnel assembly disposable within the chamber and which includes an inverted, perforated funnel having a perforated outer wall defining a funnel chamber, a small upper opening, and a large lower opening, a vertically disposed inlet pipe which extends through said upper opening and affixed to said funnel, at least one spray nozzle fluidly connected to said pipe disposed within said funnel chamber to spray water onto said wall of said perforated funnel, an inlet water pipe system which includes a main pipe that connects to the water source through said wall of said main hopper to said inlet pipe and said spray nozzle wherein water discharged from said spray nozzle impinges on said perforated wall of said perforated funnel such that particles of micronized supplement are washed through said perforated funnel forming a slurry, and an outlet water pipe system which includes a slurry pump which draws slurry formed in said main hopper and passed through said outlet opening through a slurry pump inlet pipe and pumps the slurry under pressure through a slurry pump outlet pipe into an irrigation water pipe through which the flow of irrigation water flows for irrigating the crops.

2. The dry supplement injection system according to claim 1, wherein the main hopper includes a lower funnel-shaped portion having an annular downwardly angled inner surface on which the perforated funnel rests such that the micronized particles in said main hopper are urged by gravity toward and against said perforated funnel, and the slurry formed within said perforated funnel flows downwardly and out of the outlet opening of said main hopper.

3. The dry supplement injection system according to claim 1, further comprising:
   a stand which supports the main hopper with the outlet opening thereof above ground level;
   a mixing pan disposed below said stand for receiving and holding slurry from said outlet opening of said main hopper; and
   an agitation device operatively connected to said mixing pan which induces movement of the slurry contained within said mixing pan to help prevent settling out of micronized particles in the outlet water pipe system.

4. The dry supplement injection system according to claim 3, wherein the depth of water within the mixing pan is controlled by a water level regulation device.

5. The dry supplement injection system according to claim 4, wherein the water level regulation device comprises a float valve disposed along the water inlet piping at the mixing pan.

6. The dry supplement injection system according to claim 4, further comprising an overflow prevention device which stops the inflow of water through the funnel into the mixing pan when the water level reaches a predetermined maximum water level above that at which the regulation device stops the inflow of water.

7. The dry supplement injection system according to claim 6, wherein the overflow prevention device comprises an overflow prevention sensor electrically connected to a water solenoid valve disposed along the water inlet piping, said overflow prevention sensor stops the inflow of water through said water inlet pipe into said mixing pan when the depth of the water therein reaches the predetermined maximum water level.

8. The dry supplement injection system according to claim 3, wherein the mixing pan includes a round bottom wall and an upstanding circular outer wall, and wherein the agitation device comprises a water fill pipe at least an end portion of which extends tangentially to said outer wall within said mixing pan to send the water entering therethrough and within said mixing pan in a circular motion contained by said outer wall.

9. The dry supplement injection system according to claim 1, wherein there are a plurality of spray nozzles.

10. The dry supplement injection system according to claim 1, wherein a vertical spray angle of the spray nozzle is between about 130 to 170 degrees.

11. The dry supplement injection system according to claim 1, wherein the spray nozzle comprises a fixed spray nozzle having no moving parts, and which has a substantially fixed spray pattern against the perforated funnel.

12. The dry supplement injection system according to claim 1, wherein the spray nozzle comprises a non-fixed spray nozzle having at least one moving part, and which has a moving spray pattern against and along the perforated funnel.

13. The dry supplement injection system according to claim 12, wherein the non-fixed spray nozzle comprises a rotary spray nozzle which rotates in a continuous three-hundred-sixty-degree spray pattern.

14. The dry supplement injection system according to claim 12, wherein the non-fixed spray nozzle comprises a butterfly spray nozzle.

15. The dry supplement injection system according to claim 12, wherein the non-fixed spray nozzle comprises a spinner spray nozzle which sends a water spray in a simultaneous three-hundred-sixty-degree spray pattern.

16. The dry supplement injection system according to claim 12, wherein the non-fixed spray nozzle comprises a wobbler spray nozzle.

17. The dry supplement injection system according to claim 1, wherein the perforated funnel includes a resilient annular seal disposed about a lower rim of said perforated funnel to seal against leakage of micronized particles between said perforated funnel and an interior surface of the main hopper.

18. The particulate substance according to claim 1, wherein dry supplement injection system according to claim 1, wherein respective perforations of said perforated funnel each comprise a round hole of a diameter of between about one-sixteenth and three-sixteenths inch.

19. The dry supplement injection system according to claim 1, wherein the perforated funnel has an included angle of between about 20 to 60 degrees.

20. The dry supplement injection system according to claim 19, wherein the perforated funnel has a height of between about 6 to 12 inches.

21. The dry supplement injection system according to claim 19, wherein the perforated funnel has a height of between about 12 to 24 inches.

22. The dry supplement injection system according to claim 19, wherein the perforated funnel has a height of between about 24 to 48 inches.

23. The dry supplement injection system according to claim 1, wherein the perforated funnel includes a tubular upper portion having at least one longitudinal slot and defining an upper opening of such a diameter to closely receive the water inlet pipe, and a circumferential clamp disposed around said upper portion such that said upper opening is closeable around said water inlet pipe to clamp said perforated funnel to said water inlet pipe.

24. The dry supplement injection system according to claim 1, wherein a portion of the water inlet pipe disposed within the main hopper comprises respective first and second interior pipes, said first interior pipe being affixed to the wall of the main hopper and said second interior pipe being affixed to the perforated funnel and to which the nozzle is connectable, said first and second interior pipes being hand connectable and disconnectable using a twist coupling for removal of said perforated funnel, second interior pipe, and nozzle from said main hopper.

25. The dry supplement injection system according to claim 1, wherein a hand operable valve is disposed along the water inlet pipe to permit manual control of the flow of water sent to the perforated funnel.

26. The dry supplement injection system according to claim 25, wherein a flow meter is disposed along the water inlet pipe to permit monitoring of the flow of water to the perforated funnel.

27. The dry supplement injection system according to claim 25, wherein an anti-siphon valve is disposed along the water inlet pipe to prevent water from backflowing from the main hopper should water pressure from the water source be lost.

28. The dry supplement injection system according to claim 1, further comprising a flush water piping system which includes a flush water pipe connected at a first connection point to the water inlet pipe and at a second connection point 12 the slurry outlet pipe between thy a mixing pan disposed below the outlet opening of the main hopper for receiving and holding slurry from the outlet opening of the main hopper and the slurry pump, said flush water piping system further including respective first and second flush water valves, said first flush water valve being disposed along said flush water pipe to control a flow of flush water therethrough and said second flush water valve being disposed along said slurry outlet pipe between said mixing pan and said second connection point to control the flow of slurry therethrough, said first flush water valve being closed to said flow of flush water and said second flush water valve being open to said flow of slurry during normal operation of the dry supplement injection system, and vice-versa for both priming and flushing of said pump at the beginning and ending of operation of the dry supplement injection system, respectively.

29. The dry supplement injection system according to claim 28, wherein a three way solenoid valve is disposed along the slurry outlet pipe to which the flush water outlet pipe is connected, said flush water outlet pipe being connectable to a waste water disposal such that said three way solenoid valve may selectively direct slurry and flush water to the irrigation water pipe and to a waste water disposal, respectively.

30. The dry supplement injection system according to claim 1, wherein an anti-siphon valve is disposed along one of the slurry pump inlet and outlet pipes to prevent water from backflowing therethrough should slurry pressure be lost from the pump.

31. The dry supplement injection system according to claim 1, wherein a pressure relief pipe is operatively connected to an outlet of the pump to bleed off excess slurry pressure to the flushing water outlet pipe.

32. The dry supplement injection system according to claim 1, wherein respective electrically actuatable valves are disposed along the main pipe, the water flush pipe, and the slurry pump outlet pipe, said valves being controllable by an electronic controller which is operatively connected to said valves to control the respective flows of water and slurry therethrough and to control a sequence of flows through the dry supplement injection device.

33. The dry supplement injection system according to claim 32, wherein the pump is powered by an electric motor operatively connected to the controller being controllable thereby.

34. The dry supplement injection system according to claim 1, wherein the pump comprises a diaphragm pump.

35. The dry supplement injection system according to claim 34, further comprising a flush water piping system which includes a flush water pipe connected at a first connection point to the water inlet pipe and at a second connection point to the slurry outlet pipe between a mixing pan disposed below the outlet opening of the main hopper for receiving and holding slurry from the outlet opening of the main hopper and said the slurry pump, said flush water piping system further including respective first and second flush water valves, said first flush water valve being disposed along said flush water pipe to control a flow of flush water therethrough and said second flush water valve being disposed along said slurry outlet pipe between said mixing pan and said second connection point to control the flow of slurry therethrough, said first flush water valve being closed to said flow of flush water and said second flush water valve being open to said flow of slurry during normal operation of the dry supplement injection system, and vice-versa for both priming and flushing of said pump at the beginning and ending of operation of the dry supplement injection system, respectively.

36. The dry supplement injection system according to claim 34, wherein a pressure relief pipe is operatively connected to an outlet of the pump to bleed off excess slurry pressure to the flushing water outlet pipe.

37. A dry supplement injection irrigation system connectable to a water supply for supplying water under pressure to produce a slurry from supplements in a micronized form to be used in fertigation application that may contain both dissolved and undissolved supplements, and for introducing the slurry into a flow of irrigation water and spraying onto crops, comprising:

a dry supplement injection device having a main hopper which includes an outer wall defining a main hopper chamber, an upper portion having an inlet opening, and a lower portion having an outlet opening, a perforated funnel assembly disposable within the chamber and which includes an inverted, perforated funnel having a perforated outer wall defining a funnel chamber, a small upper opening, and a large lower opening, a vertically disposed inlet pipe which extends through said upper opening and affixed to said funnel, at least one spray nozzle fluidly connected to said pipe disposed within said funnel chamber to spray water onto said wall of said perforated funnel, an inlet water pipe system which includes a main pipe that connects to the water source through said wall of said main hopper to said inlet pipe and said spray nozzle wherein water discharged from said spray nozzle impinges on said perforated wall of said perforated funnel such that particles of micronized supplement are washed through said perforated funnel forming a slurry, and an outlet water pipe system which includes a slurry pump which draws slurry formed in said main hopper and passed through said outlet opening through a slurry pump inlet pipe and pumps the slurry under pressure through a slurry pump outlet pipe; and an irrigation device to which the injection device is connectable having an irrigation water pipe through which the flow irrigation water flows for irrigating the crops.

38. The dry supplement injection irrigation system according to claim 37, wherein the irrigation device comprises a wheeled irrigation device.

39. The dry supplement injection irrigation system according to claim 38, wherein the wheeled irrigation device comprises a pivot mounted wheeled irrigation device that slowly pivots about a pivot post affixed to the ground as respective wheels thereof are driven.

40. The dry supplement injection irrigation system according to claim 39, wherein the pivot mounted wheeled irrigation device includes a plurality of wheels which are rotatably connected in pairs to respective A-frames spaced along a horizontally disposed elevated irrigation water supply pipe that is vertically supported therebetween by respective brace wire assemblies, with a plurality of respective spray heads extending downwardly from said irrigation water supply pipe between said A-frames for discharging water downwardly and outwardly onto the crops being irrigated, said wheels being rotationally powerable on said A-frames by respective water motors which are attached to said A-frames and powered by the pressurized irrigation water such that said pivot mounted wheeled irrigation device slowly pivots about the pivot post as said wheels are driven.

41. A continuous feed dry supplement injection system connectable to a water supply for supplying water under pressure to produce a slurry from supplements in a micronized form to be used in fertigation application that may contain both dissolved and undissolved supplements which is introduced into a flow of irrigation water for watering crops, comprising:

a dry supplement injection device having a main hopper which includes an outer wall defining a main hopper chamber, an upper portion having an inlet opening, and a lower portion having an outlet opening, a perforated funnel assembly disposable within the chamber and which includes an inverted, perforated funnel having a perforated outer wall defining a funnel chamber, a small upper opening, and a large lower opening, a vertically disposed inlet pipe which extends through said upper opening and affixed to said funnel, at least one spray nozzle fluidly connected to said pipe disposed within said funnel chamber to spray water onto said wall of said perforated funnel, an inlet water pipe system which includes a main pipe that connects to the water source through said wail of said main hopper to said inlet pipe and said spray nozzle wherein water discharged from said spray nozzle impinges on said perforated wall of said perforated funnel such that particles of micronized supplement are washed through said perforated funnel forming a slurry, and an outlet water pipe system which includes a slurry pump which draws slurry formed in said main hopper and passed through said outlet opening through a slurry pump inlet pipe and pumps the slurry under pressure through a slurry pump outlet pipe into an irrigation water pipe through which the flow of irrigation water flows for irrigating the crops;

a motorized feed screw assembly which includes a feed screw hopper for receiving the micronized supplement, and a motorized feed screw which includes an inclined outer tube having an inlet connected to a lower outlet of said feed screw hopper and which is upwardly inclined from said feed screw hopper to an outlet disposed above said inlet opening of said main hopper, a feed screw which closely fits within said outer tube and being rotationally driven by a motor; and wherein the micronized supplement enters said outer tube through said inlet thereof and is transported through said outer tube by said feed screw to said outlet and into said main hopper for production of slurry therefrom.

42. The continuous feed dry supplement injection system according to claim 41, further comprising a bulk bag unloading system operably connected to the hoppered feed screw for receiving and unloading bulk bags of the micronized supplement into the feed screw hopper of the hoppered feed screw.

43. The continuous feed dry supplement injection system according to claim 42, wherein the bulk bag unloading system includes an overhead loading system which includes an upright main frame having an upper portion to which is affixed an I-beam which carries a rollable motorized lift device having a dependent lift member adapted for attachment to the bulk bags for lifting, lowering, and horizontal movement of the bulk bags from a loading position to an unloading position over the feed screw hopper of the hoppered feed screw for emptying of the micronized supplement into the feed screw hopper of the hoppered feed screw and back.

44. The continuous feed dry supplement injection system according to claim 42, wherein the bulk bag unloading system includes an upright main frame having an upper portion which is removable from a lower portion thereof, said upper portion being adapted lifting using a fork lift and for hanging the bulk bags for loading and unloading thereof and of a sufficient height so as to support the bulk bags off of a supporting floor surface when separated from said lower portion such that lifting, lowering, and horizontal movement of the bulk bags from a loading position to an unloading position over the feed screw hopper of the hoppered feed screw for emptying of the micronized supplement into the feed screw hopper of the hoppered feed screw and back.

45. The continuous feed dry supplement injection system according to claim 44, wherein the bulk bag unloading system includes a shaker which is operatively connectable to the bulk bags to facilitate transfer of the micronized supplement from the bulk bag to the feed screw hopper of the hoppered feed screw.

46. A method of introducing a dry supplement into a flow of irrigation water, comprising the steps of:
providing a dry micronized supplement;
producing a slurry of the micronized supplement and water using
a mixing pan which receives and collects the slurry produced, which slurry may contain both dissolved and undissolved particles of the micronized supplement, by spraying water at an interior surface of an inverted perforated funnel which separates the dry micronized supplement from an interior chamber of the funnel; and
pumping the slurry produced into a flow of irrigation water for watering crops.

47. The method according to claim 46, wherein the step of producing the slurry is conducted by spraying water which is at a pressure of at least about 45 pounds per square inch (3 bars) guage pressure.

48. The method according to claim 46, wherein the step of providing the dry micronized supplement comprises providing dry micronized supplement that includes at least some gypsum, and wherein the steps of producing the slurry and pumping the slurry produced into the flow of irrigation water are conducted using water flow rates to produce the slurry and of the irrigation water such that an amount of gypsum used in the process exceeds the saturation point of the gypsum in water of about one pounds of gypsum per every fifty gallons of water.

49. The method according to claim 46, wherein the step of producing the slurry is conducted using a perforated funnel which includes a resilient annular seal disposed about a lower rim of the perforated funnel to seal against leakage of micronized particles between the perforated funnel and an interior surface of the main hopper.

50. The method according to claim 46, wherein the step of producing the slurry is conducted using a perforated funnel wherein respective perforations thereof each comprise a round hole of a diameter smaller than about one-eighth inch.

51. The method according to claim 46, wherein the step of producing the slurry is conducted using a perforated funnel which has an included angle of between about 20 to 60 degrees.

52. The method according to claim 51, wherein the step of producing the slurry is conducted using a perforated funnel which has a height of between about 6 to 12 inches.

53. The method according to claim 51, wherein the step of producing the slurry is conducted using a perforated funnel which has a height of between about 12 to 24 inches.

54. The method according to claim 51, wherein the step of producing the slurry is conducted using a perforated funnel which has a height of between about 24 to 48 inches.

55. The method according to claim 46, wherein the step of producing the slurry is conducted using a spray nozzle having a vertical spray angle of between about 130 to 170 degrees.

56. The method according to claim 46, wherein the steps of providing a dry micronized supplement comprises providing a dry micronized supplement wherein at least between about ninety-five to ninety-nine percent of the particles are smaller than about 74 microns (200 mesh) in size.

57. The method according to claim 46, wherein the step providing a dry micronized supplement comprises providing a dry micronized supplement wherein at least between about ninety to ninety-five percent of the particles are smaller than about 74 microns (200 mesh) in size.

58. The method according to claim 46, wherein the step providing a dry micronized supplement comprises providing a dry micronized supplement wherein at least between about seventy-five to ninety percent of the particles are smaller than about 74 microns (200 mesh) in size.

59. The method according to claim 46, wherein the step of pumping the slurry produced is conducted using a type of irrigation chosen from the group consisting of sprinkler irrigation, pivot irrigation, flood irrigation, drip irrigation, hand line irrigation, and wheel line irrigation.

60. The method according to claim 46, wherein the step of pumping the slurry produced is conducted using a diaphragm pump.

61. The method according to claim 46, wherein the step of producing the slurry includes agitating the slurry collected in the mixing pan to minimize settling out of undissolved particles therein.

62. The method according to claim 46, wherein the step of producing the slurry includes regulating the slurry within the mixing pan between a minimum and a maximum depth by adding additional water to the slurry collected in the mixing pan.

63. The method according to claim 62, wherein the step of producing the slurry includes regulating and adding water to the slurry using a float valve, wherein entry of the additional water into the mixing pan agitates the slurry collected in the mixing pan to minimize settling out of undissolved particles therein.

64. The method according to claim 46, wherein the step of producing the slurry is conducted using a plurality of spray nozzles disposed within the interior chamber of the perforated funnel.

65. A dry supplement injection system connectable to a water supply for supplying water under pressure to produce a slurry from supplements in a micronized form to be used in fertigation application that may contain both dissolved and undissolved supplements which is introduced into a non-pressurized flow of irrigation water for watering crops, comprising:
a dry supplement injection device having a main hopper which includes an outer wall defining a main hopper chamber, an upper portion having an inlet opening, and a lower portion having an outlet opening;
a perforated funnel assembly disposable within the chamber and which includes an inverted, perforated funnel having a perforated outer wall defining a funnel chamber, a small upper opening, and a large lower opening, a vertically disposed inlet pipe which extends through said upper opening and affixed to said funnel, at least one spray nozzle fluidly connected to said pipe disposed within said funnel chamber to spray water onto said wall of said perforated funnel;
an inlet water pipe system which includes a main pipe that connects to the water source through said wall of said main hopper to said inlet pipe and said spray nozzle wherein water discharged from said spray nozzle impinges on said perforated wall of said perforated funnel such that particles of micronized supplement are washed through said perforated funnel forming a slurry; and an outlet water pipe system which includes a slurry pump outlet pipe through which slurry formed in said main hopper and passed through said outlet opening flows by gravity feed into a non-pressurized irrigation water conduit through which the flow of irrigation water flows for irrigating the crops.

66. The dry supplement injection system according to claim 65, wherein the main hopper includes a lower funnel-shaped portion having an annular downwardly angled inner surface on which the perforated funnel rests such that the micronized particles in said main hopper are urged by gravity toward and against said perforated funnel, and the slurry formed within said perforated funnel flows downwardly and out of the outlet opening of said main hopper.

67. The dry supplement injection system according to claim 65, further comprising:

a stand which supports the main hopper with the outlet opening thereof above ground level;

a mixing pan disposed below said stand for receiving and holding slurry from said outlet opening of said main hopper; and an agitation device operatively connected to said mixing pan which induces movement of the slurry contained within said mixing pan to help prevent settling out of micronized particles in the outlet water pipe system.

68. The dry supplement injection system according to claim 67, wherein the depth of water within the mixing pan is controlled by a water level regulation device.

69. The dry supplement injection system according to claim 68, wherein the water level regulation device comprises a float valve disposed along the water inlet piping at the mixing pan.

70. The dry supplement injection system according to claim 68, further comprising an overflow prevention device which stops the inflow of water through the funnel into the mixing pan when the water level reaches a predetermined maximum water level above that at which the regulation device stops the inflow of water.

71. The dry supplement injection system according to claim 70, wherein the overflow prevention device comprises an overflow prevention sensor electrically connected to a water solenoid valve disposed along the water inlet piping, said overflow prevention sensor stops the inflow of water through said water inlet pipe into said mixing pan when the depth of the water therein reaches the predetermined maximum water level.

72. The dry supplement injection system according to claim 67, wherein the mixing pan includes a round bottom wall and an upstanding circular outer wall, and wherein the agitation device comprises a water fill pipe at least an end portion of which extends tangentially to said outer wall within said mixing pan to send the water entering therethrough and within said mixing pan in a circular motion contained by said outer wall.

73. The dry supplement injection system according to claim 65, wherein there are a plurality of spray nozzles.

74. The dry supplement injection system according to claim 65, wherein a vertical spray angle of the spray nozzle is between about 130 to 170 degrees.

* * * * *